INVENTORS.
JAMES J. ARCHAMBEAU
MAURICE J. GRESKOWIAK

ATTORNEYS.

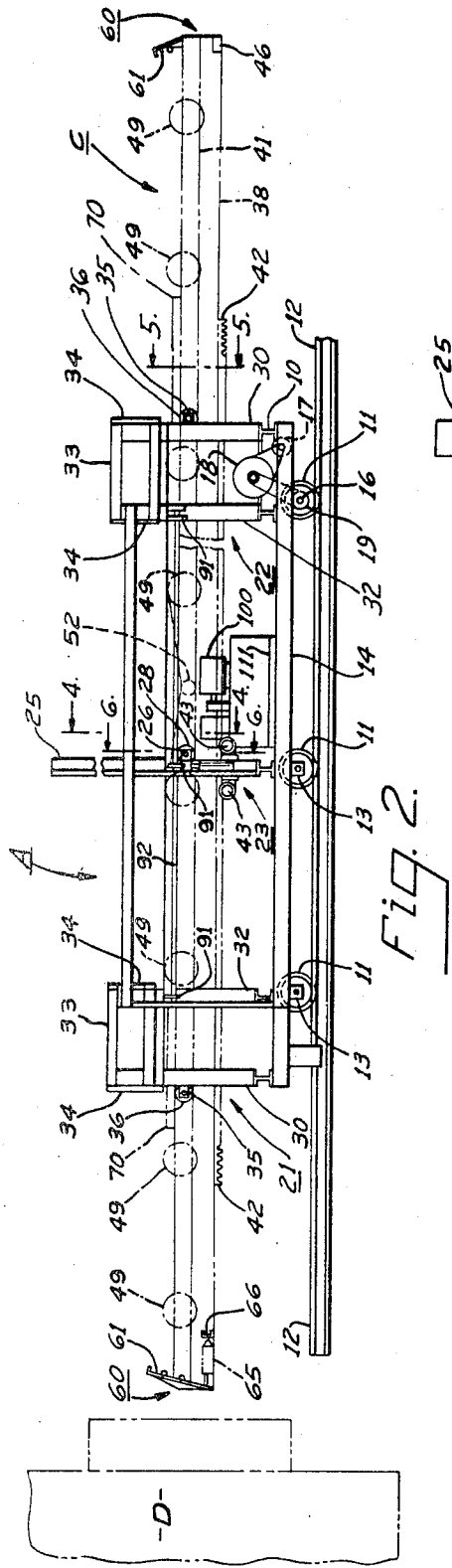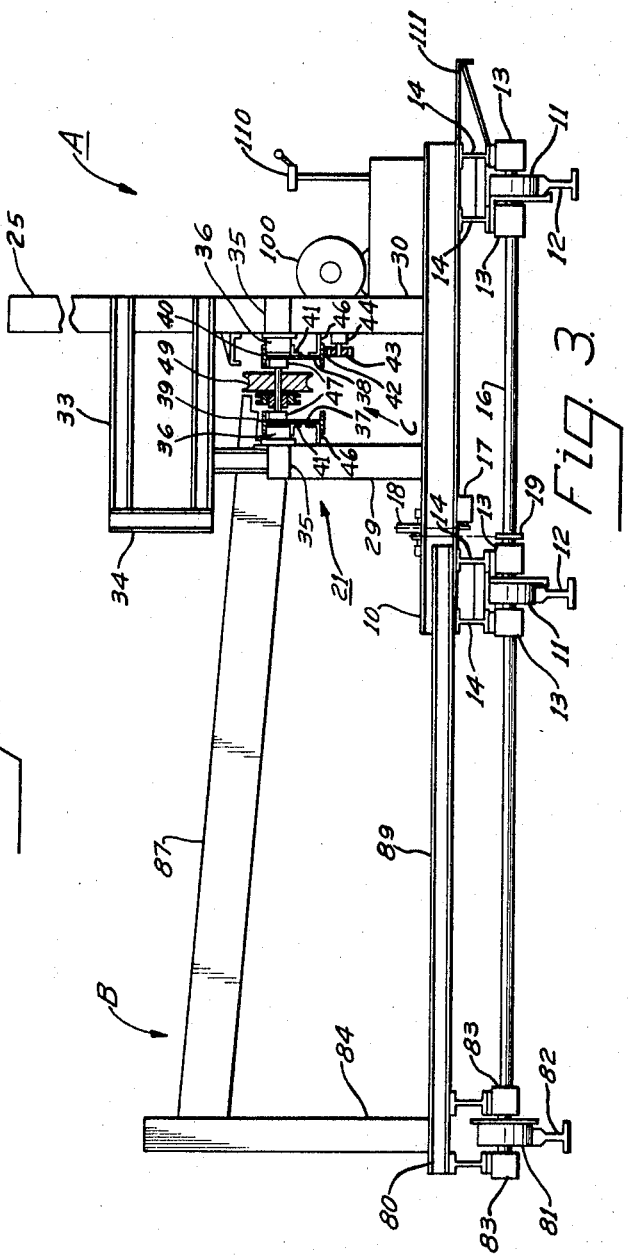

INVENTORS.
JAMES J. ARCHAMBEAU
MAURICE J. GRESKOWIAK

ATTORNEYS.

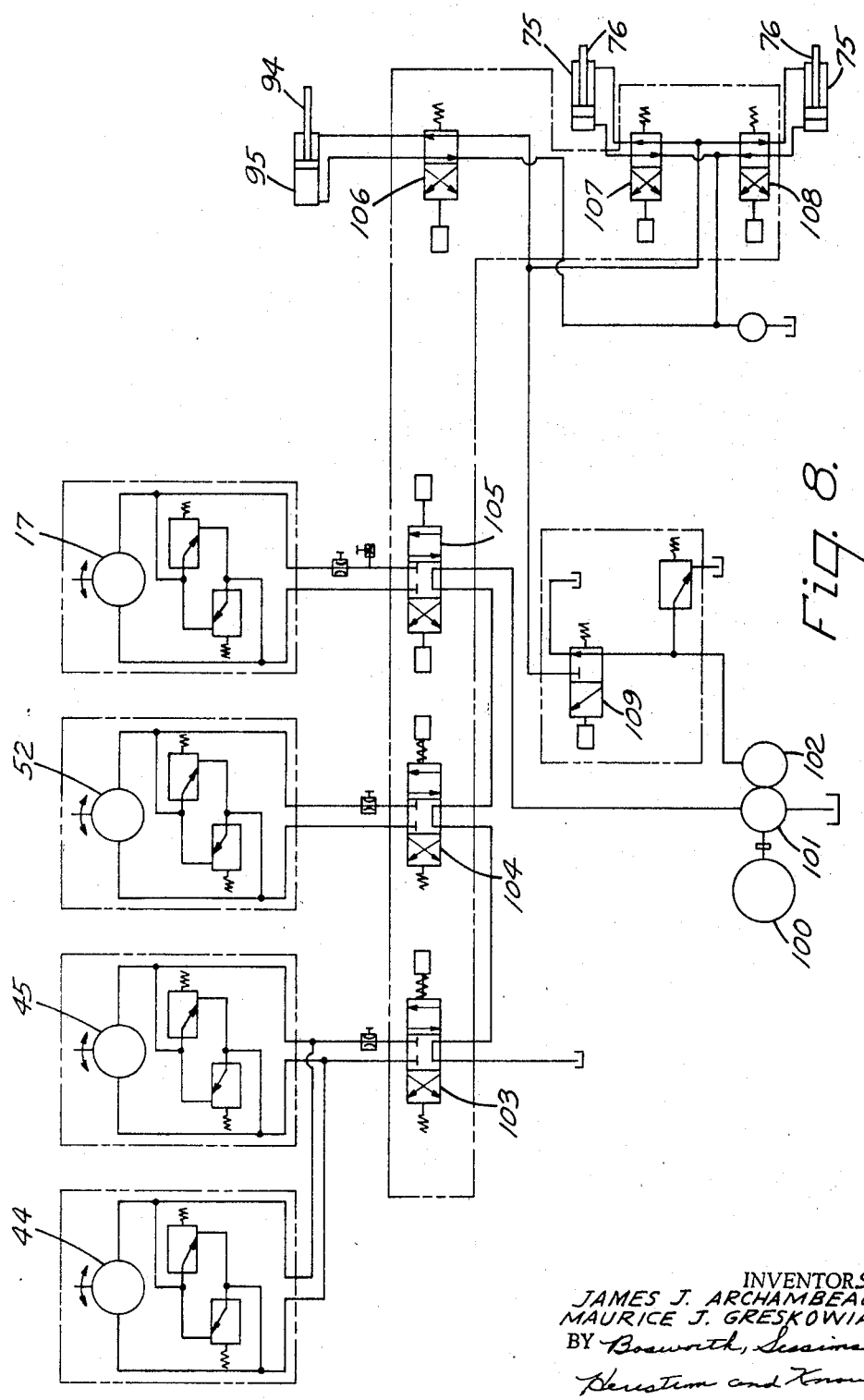

United States Patent Office 3,439,816
Patented Apr. 22, 1969

3,439,816
CHARGING APPARATUS FOR AN ENCLOSURE
James J. Archambeau, Chisholm, and Maurice J. Greskowiak, Hibbing, Minn., assignors to Arthur G. McKee & Company, Cleveland, Ohio, a corporation of Delaware
Filed Dec. 23, 1966, Ser. No. 604,250
Int. Cl. B65g 65/30, 15/28, 47/34
U.S. Cl. 214—29                  10 Claims

ABSTRACT OF THE DISCLOSURE

This disclosure relates to a charging apparatus for conveying and depositing elongated members, such as rods used in rotary grinding mills, longitudinally into an enclosure such as a rod mill drum. The apparatus includes a storage rack and a carriage which may be extended longitudinally into the enclosure to be charged. The carriage includes a conveyor which conveys the elongated members into the enclosure, and a dump mechanism which dumps the elongated members laterally from the carriage when they reach a position within the enclosure.

Background of the invention

This invention provides a novel and improved apparatus and method for charging elongated members such as rods, bars, rails or the like into an enclosure having an opening in the end thereof. By way of exemplification, and not of limitation, it will be illustrated and described with reference to the feeding of elongated rods or bars through an opening in the end wall of a rotary pulverizer of the type which tumbles elongated rods in a drum rotating about a fixed horizontal axis. Such mills are generally termed "rod mills" and are used to grind ore and other raw materials into a powdered or comminuted form.

Rod mills are constructed to meet many varying industrial requirements, the most common of which is the grinding of ore, particularly iron ore such as taconite. Ore grinding mills are usually quite large, such as from ten to eighteen feet in diameter and the rods, which are generally formed of steel, range from around three to six inches in diameter and from around fifteen to twenty feet in length (substantially the length of the drum). Normally the rods occupy from about one-third to one-half the total volume of the drum.

The ore to be ground is fed continuously into the mill through a relatively small axial opening at one end thereof and is comminuted by the tumbling action of the steel rods as the drum rotates. The entering ore comprises fragments of a size ranging up to about one inch in greatest dimension. Since the steel rods become worn by the abrasive action of the ore after continued use, it is necessary to load new rods into the mill at regular intervals. The worn rods eventually disintegrate into small steel particles and are discharged with the comminuted material.

The charging of the drum with new rods at spaced time intervals presents several problems since the rod are necessarily quite large and heavy making manual charging difficult and often impossible. Also, since most mills must be maintained in continuous operation for as long a time as possible for reasons of economy, the shut-down time for rod charging must be held to a minmium.

Prior art rod charging devices such as those shown in the U.S. Patent to Walter, No. 2,921,699, and Clark, No. 3,169,642, have utilized rod conveyors which must be moved into and retracted from the drum each time a rod is dumped, or which alternatively extend only part way into the drum and convey the rod inwardly past the end of the conveyor until it tips downward, slides off the end and drops into the charge of rods therein. In both of these types of devices the inward end of the rod being charged generally strikes the closed end of the drum and may cause damage. Also, the prior art devices require a substantial period of time in order to complete the charging operation in the typical situation where about 25 rods must be loaded into the drum. This necessitates shutting down all of the equipment utilized during the continuous processing of the ore.

The rod charging apparatus of the present invention overcomes the objections indicated above and affords other features and advantages not obtainable from the the prior art.

Summary of the invention

According to the invention there is provided a charging apparatus utilizing an elongated carriage for the rods, the carriage being slidably mounted for longitudinal movement into and out of a rod mill drum through an axial opening at one end therefo. The carriage is preferably supported on a wheeled stand which is movable on rails that extend either parallel to or perpendicular to the direction of movement of the carriage so that the apparatus may be used to charge more than one rod mill. Preferably located at one side of the stand laterally of the carriage is a rack for storing the rods and for feeding the rods to the carriage. Means are provided for selectively transferring the rods one-at-a-time from the rack to the carriage and for conveying the rods longitudinally from the stand through the opening in the mill to be a position wherein the rod is supported entirely within the drum. Located at the end of the carriage is a limiting means which stops longitudinal travel of the rod and prevents the rod from striking the end of the drum. A dumping mechanism located adjacent the end of the carriage, dumps the rod laterally from the carriage so that it drops onto the charge of rods located in the drum. The operating mechanisms associated with the machine may be powered by any suitable means, hydraulic equipment being particularly adaptable.

In the preferred embodiment the carriage is effective to charge rods from both of its ends so that the stand may be mounted for travel on rails arranged parallel to the axes of two axially aligned rod mills and moved into position for charging either one of them as desired. Due to space limitations the carriage cannot normally be cantilevered out from both ends of the stand a sufficient distance to permit charging from either end without moving the carriage relative to the stand. Accordingly the carriage must be movable longitudinally on the stand to permit charging from one end or the other.

With this arrangement rods may be loaded into a mill successively one after another in rapid order until the desired number of rods have been supplied. The conveyor need not be retracted from the drum before the insertion of each rod but rather remains within the drum until the charging operation is completed.

It is among the objects of the invention to provide a new and improved rod charging apparatus which minimizes the mill shut-down time during the charging operation.

Another object of the invention is to provide a rod charger which prevents rods being loaded into a rod mill drum from striking the end of the drum.

A further object of the invention is to provide a rod charger for rod mills which utilize a rod carriage and conveyor mechanism which need not be retracted from the drum each time a rod is loaded.

Other objects, uses and advantages of the invention will be apparent from the following detailed description and drawings.

Brief description of the drawings

FIGURE 2 is a side elevational view of the rod charging apparatus of FIGURE 1 with the carriage located outside of the rod mill drum;

FIGURE 3 is an end elevational view of the rod charging apparatus of FIGURE 1;

FIGURE 8 is a schematic view showing the hydraulic system for operating the various mechanism of the apparatus.

Description of the preferred embodiment

Figure 1:
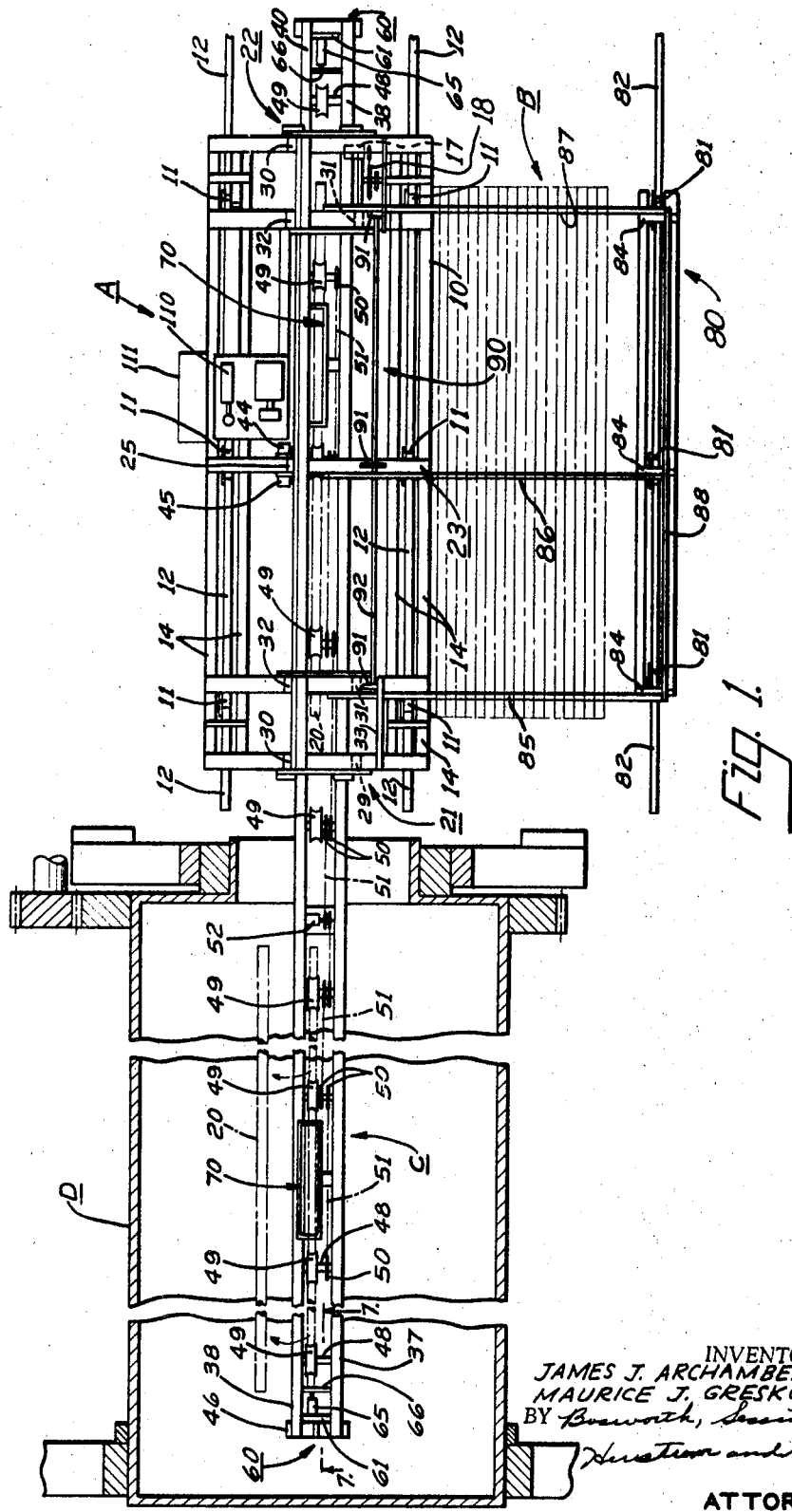
FIGURE 1 is a plan view showing a rod charging apparatus embodying the invention with the carriage in operating position within a rod mill drum, the drum being shown in section.

Referring more particularly to the drawings, FIGURE 1 to 3 show a rod charging apparatus according to the invention comprising a wheeled stand A, a storage rack B and an elongated carriage C, the apparatus being adapted to charge rods from one end thereof into a rod mill drum indicated by the letter D. The stand A includes a rectangular base frame 10 supported on flanged wheels 11 which ride on rails 12. The wheels 11 are mounted on a live axle carried in bearing blocks 13 welded to steel I-beams 14 mounted below the base frame 10.

The wheels 11 at the right hand end of the stand, as viewed in FIGURE 2, are connected to a drive shaft 16, best shown in FIGURE 3, the shaft 16 being chain driven by a reversible hydraulic motor 17, best shown in FIGURE 2, which will be described below with reference to the hydraulic system.

Mounted at opposite ends of the base frame 10 are two carriage support frames 21 and 22 which serve to support the carriage C. The support frame 21 and 22 are rectangular in form and comprise steel I-beams welded together as shown. Both support frames 21 and 22 are substantially identical and will be described below with reference to the support frame 21, as shown in FIGURE 3.

Figure 4:
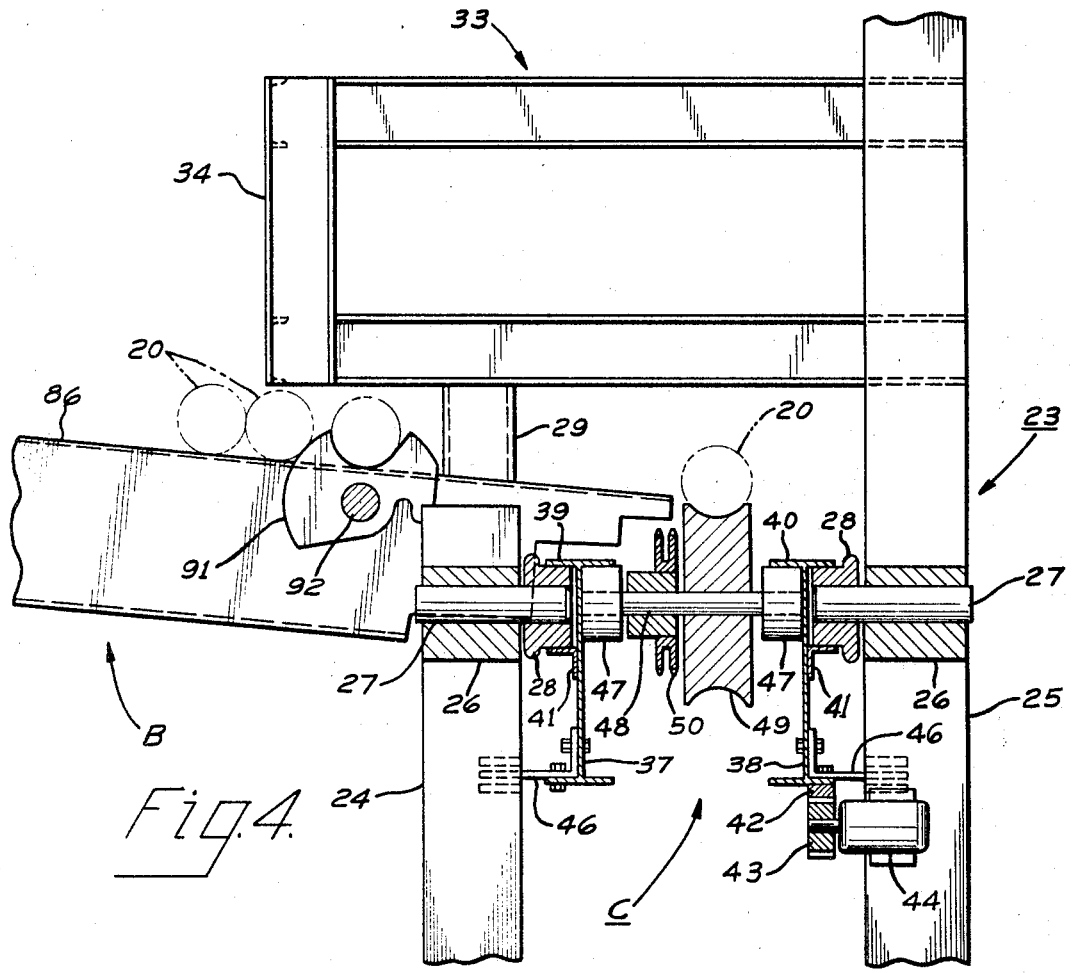
FIGURE 4 is a fragmentary sectional view on an enlarged scale taken on the line 4—4 of FIGURE 2.

Located centrally of the base frame 10 is another carriage support frame 23 which also helps to carry and guide the carriage C. As shown in FIGURE 4, the support frame 23 comprises two vertical posts 24 and 25, the post 25 extending upwardly well above the stand A to receive overhead electrical lines for operating the drive equipment. Welded to each of the posts 24 and 25 is a bearing block 26, each bearing block supporting a pin 27 with a free-wheeling roller 28 mounted on the inwardly extending end thereof. The rollers 28 serve to support the carriage C for longitudinal movement on the stand A. The post 24 does not extend above the plane of the conveyor rolls on the carriage C so that it does not interfere with the lateral movement of the rods from the rack B onto the carriage C.

The support frame 21 best shown in FIGURES 2 and 3 has four corner posts including two posts 29 and 30 mounted at the end of the stand A and two vertical posts 31 and 32 spaced inwardly therefrom. The posts 29, 30 and 32 support a "box"-shaped upper frame 33 formed of steel channel members and having vertical end posts 34 which extend over the rack B and which have their lower ends closely spaced to the rod carrying plane of the rack so that only one rod at a time can roll between the rack and the posts 34. The post 31 FIGURE 1 does not extend above the plane of the conveyor rolls so that it does not interfere with the lateral movement of the rods from the rack B to the carriage C.

Welded to each post 29 and 30 (FIGURE 3) is a bearing block 35 which receives a pin (not shown). The pins extend inwardly toward one another and the inward ends thereof carry free-wheeling rollers 36 which serve to support the carriage C for longitudinal movement on the stand A. This arrangement corresponds to the mounting of the rollers 28 of the central carriage support frame 23.

The carriage C includes two elongated steel I-beams 37 and 38 that provide a support for the moving parts which convey the rods 20. The top flanges 39 and 40 rest on the rollers 28 and 36, as best shown in FIGURES 3 and 4. Welded mid-way between the flanges to the web of the I-beams 37 and 38 are elongated angle bars 41 which are engageable with the rollers 28 and 36 to prevent tipping of the carriage C when it is cantilevered out away from the stand A such as during the charging of a mill.

Welded to the bottom of the I-beam 38 is a longitudinally extending rack 42 which is engaged by two pinions 43 driven by reversible hydraulic motors 44 and 45 connected in parallel. The motors 44 and 45 are mounted on opposite sides of the vertical post 25 of the central carriage support frame 23 and serve to drive the carriage C back and forth throughout its range of longitudinal travel on the stand A.

Bolted to the web of each I-beam 35 and 36 adjacent the ends thereof are L-shaped stop brackets 46 (FIGURES 3 and 4) that extend outwardly from the carriage and are engageable with the vertical posts 29 and 30 of the carriage support frames 21 and 22 to limit the longitudinal travel of the carriage and prevent its being driven off the stand A.

Mounted at spaced intervals at the upper portion of the steel I-beams 37 and 38 in opposed relation relative to one another are pairs of bearing blocks 47, six such pairs being provided in the embodiment shown, as indicated in FIGURES 1 and 2. Each pair of bearing blocks 47 rotatably supports a shaft 48 which has keyed thereon a conveyor roll 49 and a double sprocket 50. The rolls 49 serve to support the rod 20 being conveyed longitudinally on the carriage C and also provide the necessary movement to propel the rod in the desired direction toward an end of the carriage. The conveyor rolls 49 are driven by the double sprockets 50 which are in turn driven by longitudinal roller chains 51, best shown in FIGURE 2. Each chain 51 extends between two adjacent double sprockets 50 and the ends of the chain engage one set of teeth on each sprocket. The end of the next successive chain engages the adjacent set of sprocket teeth. Accordingly all of the conveyor rolls 49 are driven at the same speed. The roller chains 51 are driven by a reversible hydraulic motor 52 mounted on the carriage C in the position shown in FIGURE 2. The motor 52 has a double drive sprocket which engages two of the chains 51 to drive the entire set of conveyor rolls 49. In the apparatus illustrated herein the conveyor rolls 49 are spaced about eight feet from one another to insure that each rod 20 being conveyed is supported by at least two rolls at all times.

Figure 7:
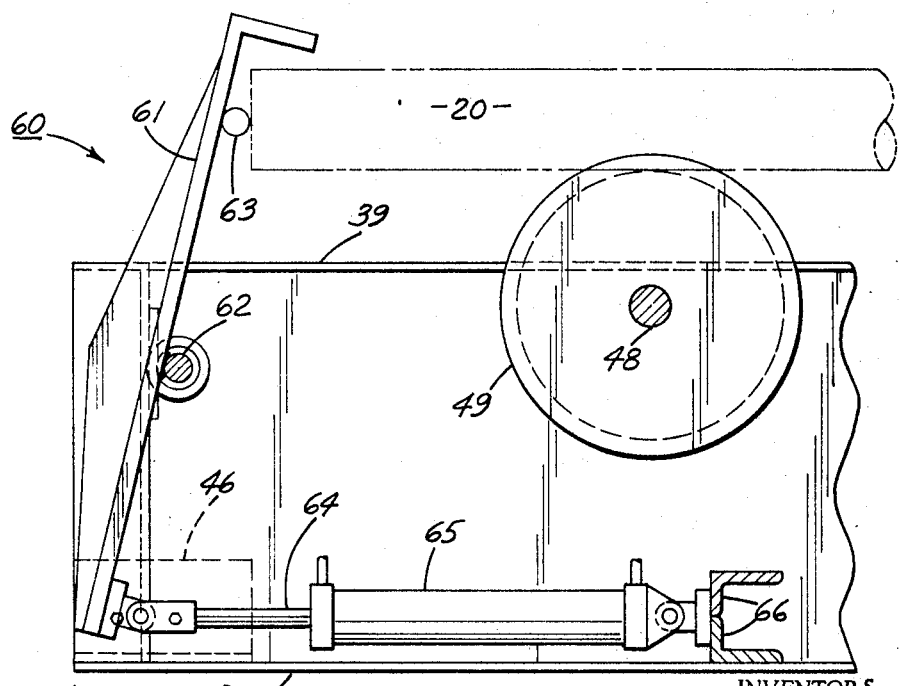
FIGURE 7 is a fragmentary longitudinal sectional view on an enlarged scale taken on the line 7—7 of FIGURE 3 and showing the shock absorber mechanism at one end of the carriage.

Referring next to FIGURE 7 there is shown one of the two shock absorber mechanisms 60 one of which is located at each end of the carriage C to stop longitudinal travel of the rod being conveyed when it reaches the end of the carriage and to prevent the end of the rod from striking the end surface of the rod mill drum. Each shock absorber mechanism 60 includes a reinforced steel plate 61 mounted for pivotal movement about a pin 62 which extends between the steel I-beams 37 and 38. The upper end of the steel plate 61 is normally tilted slightly inwardly, as shown in FIGURE 7, and has a steel rod 63 welded thereon at a position wherein it receives the impact from the approaching steel rod. The lower end of the steel plate 61 is pivotally connected to a piston rod 64 that is attached to a piston received in spring return hydraulic cylinder 65, the cylinder 65 being horizontally arranged and pivotally connected at its opposite end to mounting brackets 60 which are welded to the lower flange of the steel I-beams 37 and 38.

Figure 5:
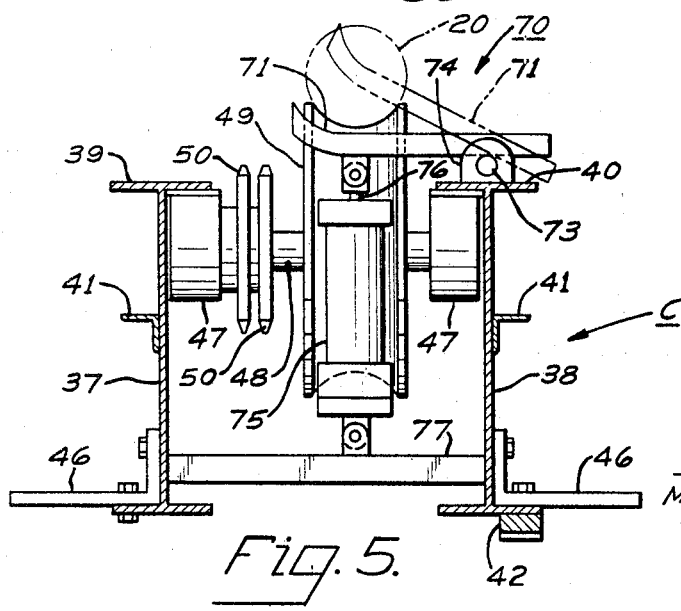
FIGURE 5 is a fragmentary sectional view on an enlarged scale taken on the line 5—5 of FIGURE 2 and showing the dump mechanism.

Referring next to FIGURE 5 there is shown one of the two dump mechanisms 70 for removing a rod from the end of the carriage after it has been positioned by the conveyor rolls 49 within the drum of the rod mill. Each mechanism 70 includes three ejector fingers 71 secured together by cross members to provide a rigid assembly. The entire assembly is pivotally mounted on the upper flange 40 of the I-beam 38 by means of an elongated hinge pin 73 pivotally mounted in brackets 74 welded to the flange 40. The mechanism 70 is operated by a hydraulic cylinder 75 having a piston rod 76 pivotally connected to a bracket mounted on the middle ejector finger 71 at a point located immediately below rods being conveyed on the conveyor rolls. The lower end of the hydraulic cylinder 75 is pivotally connected to a cross bar 77 which extends laterally between the steel I-beams 37 and 38. The cylinder 75 serves to move the dump mechanism 70 between its normal position shown in solid lines in FIGURE 5 and its dump position shown in dashed lines in FIGURE 5, the pressures available being sufficient to lift a rod 20 upwardly off of the conveyor rolls 49 whereupon the rod rolls laterally down the sloping ejector fingers 71 and falls into the charge of rods within the rod mill drum.

The rack B, best shown in FIGURES 1 and 3, includes a longitudinal base frame 80 at the outer end thereof comprising two elongated steel I-beams connected together by cross bracing. The base frame 80 is supported on flanged wheels 81 which ride on a rail 82 spaced laterally from and parallel to the rails 12. The wheels 81 are mounted on a pin received in bearing blocks 83 connected to the bottom of the steel I-beams of the base frame 80. As indicated in FIGURE 1, three wheels 81 are arranged in tandem in spaced relation on the outer end of the rack B. The wheel at the right hand side of the base frame 80, as viewed in FIGURE 1, is driven by an extension of the drive shaft 16 which drives the adjacent wheels 11 of the stand A, as indicated in FIGURE 3.

The base frame 80 supports three vertical posts 84 which in turn support three lateral members 85, 86 and 87 in the form of steel I-beams, the lateral members extending between the posts 84 and the stand A. The top flanges of the lateral members provide a sloped bed for storing the rods to be charged. The outer ends of the lateral members 85, 86 and 87 are connected by a tie beam 88. The slope of the lateral members 85, 86 and 87 is adjustable to provide the necessary pitch so that rods positioned on the rack will be fed by gravity toward the carriage C. The post 84 at the right hand side of the rack B as viewed in FIGURE 1 is connected to the stand A by a cross member 89 to stabilize the rack during adjustment of the lateral members 85, 86 and 87.

Figure 6:
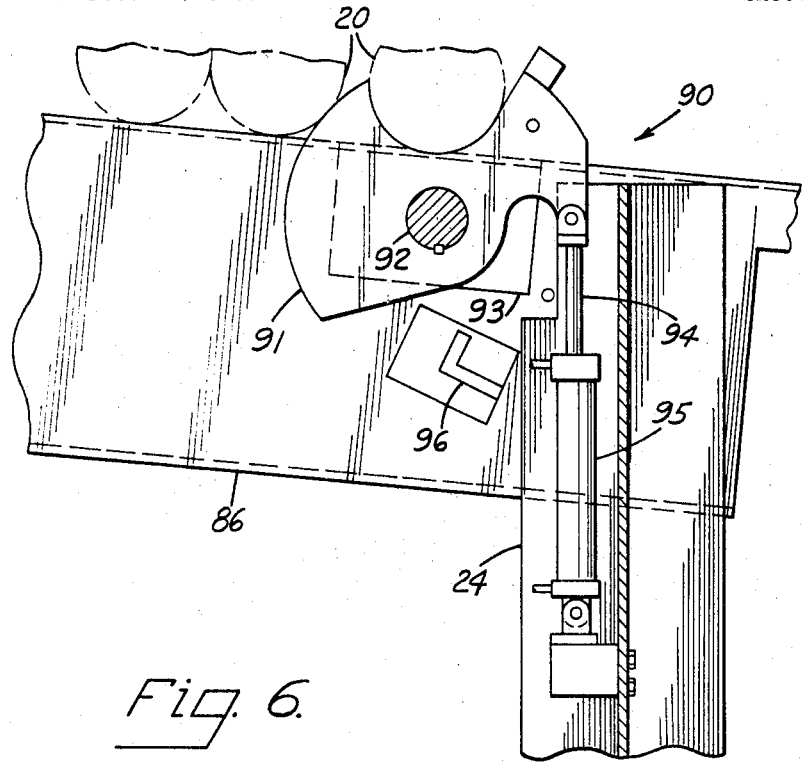
FIGURE 6 is a fragmentary sectional view on an enlarked scale taken on the line 6—6 of FIGURE 2, showing the trip mechanism for selectively loading the rods one-at-a-time on the carriage.

Referring to FIGURES 4 and 6 there is shown the trip mechanism 90 which includes three rod selector plates 91 mounted parallel to one another and keyed to a common shaft 92 journaled in bearing blocks 93 welded to the lateral members 85, 86 and 87 of the rack B.

The rod engaging portions of the selector plates 91 extend above the plane of the lateral members 85, 86 and 87 and have a cut-out formed therein with a configuration to match the cross section of the rods 20. Accordingly rotary movement of the selector plates 91 in a clockwise direction, as viewed in FIGURES 4 and 6, causes one of the rods 20 to be received in the cut-out while the other rods are prevented from movement toward the conveyor rolls 49 by the adjacent portions of the selector plates 91. The rod so selected travels on the rack B toward the carriage C as the selector plates 91 are turned, and ultimately reaches a position where it is permitted to roll freely onto the conveyor rolls 49, as shown in FIGURE 4.

Rotary movement of the selector plates 91 and the shaft 92 is provided for by means of a piston rod 94 operated by a hydraulic cylinder 95, the piston rod 94 being connected at one end to the center selector plate 91 and the cylinder 95 being pivotally connected at its lower end to the vertical post 24 of the center support frame 23. A stop 96 welded to the web of the lateral member 86 limits the rotary movement of the selector plates as they are turned counter clockwise back to their rod receiving position.

FIGURE 8 shows the hydraulic system for operating the working parts of the apparatus, the system being supported entirely by the stand and carriage with the electrical power lines for operating the pump motor being distributed to the machine by an over-head system including spring return reels to maintain desired tension as the stand A moves between its various operating position on the rails 12. The system includes an electric motor 100 which drives two hydraulic pumps 101 and 102. The pump 101 supplies fluid for operating the two reversible rack drive motors 44 and 45 which are connected in parallel and mounted on opposite sides of the vertical post 25 of the center support frame 23. These motors turn the pinions 43 which engage the rack 42 secured to the bottom of the I-beams 38 of the carriage C. The pump 101 also operates the reversible rod drive motor 52 and the reversible main drive motor 17. The rod drive motor 52 is mounted on the carriage C and receives its hydraulic fluid through flexible hydraulic lines attached to spring return reels so that the longitudinal movement of the carriage C can be accommodated. When the torque on the conveyor rolls 49 is increased beyond a preset limit such as when a rod 20 strikes a shock absorber 60 at an end of the carriage C, the motor 52 and rolls 49 will stop while maintaining the preset torque. The main drive motor 17 is mounted on the base frame 10 and turns a sprocket connected by a roller chain to a reduction unit 18 which drives another roller chain that in turn drives a sprocket 19 secured to the drive shaft 16. The rack drive motors 44 and 45, rod drive motor 52, and main drive motor 17 are controlled by manually operated four-way valves 103, 104 and 105 respectively.

The pump 102 operates the cylinder 95 of the trip mechanism 90 and the two cylinders 75 of the dump mechanism 70. The trip mechanism cylinder 95 is controlled by a manually operated four-way valve 106 and the dump mechanism cylinders 75 are each independently controlled by one of two manually operated four-way valves 107 and 108. A manually operated two-way master control valve 109 for the cylinders 75 and 95 actuates the fluid lines to the valves 106, 107 and 108 when the trip mechanism 90 and dump mechanisms 70 are to be put into operation.

The manual controls for the hydraulic system are located on a console 110 on the stand A and a platform 111 is provided on the stand for the operator.

*Operation*

At the start of the charging operation the rack B is normally loaded with enough rods 20 to charge two mills, the carriage C being initially retracted to its neutral position on the stand A. The apparatus is then driven up to stops near the mill to be charged, and pinned to the rails. It is necessary that the stand be firmly fixed in this position on the rails since the reaction experienced when the carriage C is accelerated to operating position would tend to change the position of the machine. As soon as the rod mill D is stopped the carriage C is extended through the opening at the end of the mill to the position indicated in FIGURE 1 and fixed in position on the stand A such as by locking pins. The conveyor rolls 49 are then started. The rods 20 roll down the sloping surface of the rack B until they are stopped by the selector plates 91 of the trip mechanism 90. The trip mechanism 90 is actuated using the hydraulic cylinder 95 and the selector plates 91 feed one rod 20 onto the conveyor rolls 49. The trip mechanism is then returned to its rod receiving position.

The conveyor rolls 49 accelerate the rod 20 and move it to the end of the carriage C where it strikes the appropriate shock absorber mechanism 60. When the rod stops, the resistance is sufficient to stop movement of the rolls 49 but a constant torque is maintained so that the end of the rod 20 is held against the shock absorber plate 61.

The hydraulic cylinders 75 which operates the appropriate dump mechanism 70 at the end of the carriage C within the rod mill drum are then actuated to lift the rod 20 off the conveyor rolls 49 and dump it into the rod mill drum with the charge therein, after which the dump mechanism 70 is returned to its neutral position. The carriage C is then ready to receive another rod 20 from the rack B.

This process is repeated until the mill is fully charged. The carriage C is then withdrawn from the drum to the position shown in FIGURE 2 and the mill can be restarted. When one mill has been charged the unit is driven along the rails to the opposite mill if such be the case where the cycle is repeated. When the second mill has been completely charged the apparatus is driven along the rails to a position between the mills where it is stored until its next charging cycle.

It will be understood that this invention has been shown and described with reference to a preferred embodiment thereof which is intended for the purpose of illustration rather than limitation, and other variations and modifications will be apparent to those skilled in the are within the intended spirit and scope of the invention, wherefore the patent is not to be limited to the form or forms of method and apparatus herein as specifically illustrated and described nor in any other manner inconsistent with the progress by which the art has been promoted by this invention.

We claim:

1. Apparatus for loading elongated members in an enclosure comprising a stand, an elongated carriage supported by said stand and adapted for longitudinal movement between a position wherein a longitudinal end portion of said carriage extends into an enclosure and a position wherein said end portion is withdrawn from said enclosure, conveyor means supported in fixed relation to said carriage for conveying elongated members longitudinally on said carrage, means for halting said elongated members on said carriage when said members reach a predetermined longitudinal position on said carriage and dump means for laterally unloading a member from said carriage when said member is stopped after being conveyed into the enclosure.

2. Apparatus as defined in claim 1 including a rack adjacent said stand for storing elongated members to be conveyed on said carriage, said rack having supporting members defining a plane which slopes toward said stand whereby elongated members stored on said rack are urged laterally by gravity toward said stand and means for selectively feeding elongated members one-at-a-time from said rack to said carriage.

3. Apparatus as defined in claim 2 wherein said means for selectively feeding elonagted members to said carriage comprises a manually operated trip mechanism including rotary selector members secured to a common rotary shaft aligned parallel to said rack, said members defining a recess formed to match a cross sectional portion of an elongated member and having portions adjacent said recess that extend above the supporting plane of said rack, and means for turning said selector members and shaft whereby said members receive an elongated member in said recess and move it laterally while preventing lateral rolling movement of other elongated members loaded on said rack, said selected elongated member being ultimately released to roll onto said carriage.

4. Apparatus as defined in claim 1 wherein said means for conveying elongated members along said carriage comprises a plurality of rolls adapted to support elongated members thereon and means for turning all of said rolls simultaneously at the same speed to propel elongated members longitudinally thereon.

5. Apparatus as defined in claim 4 wherein said means for turning said rolls comprises a reversible motor operatively connected to said rolls.

6. Apparatus as defined in claim 1 including means for moving said carriage longitudinally in opposite directions on said stand.

7. Apparatus as defined in claim 6 wherein said means for moving said carriage on said stand comprises a rack and pinion, and a reversible motor adapted to drive said pinion one of said rack and pinion being mounted on said stand and the other on said carriage.

8. Apparatus as defined in claim 1 wherein said stand is adapted for travel on rails to a plurality of operating positions, each position permitting charging of a different enclosure, and wherein means are provided for propelling said stand on said rails.

9. Apparatus as defined in claim 8 wherein said means for propelling said stand comprises flanged wheels and a reversible motor operatively connected to at least two of said wheels.

10. Apparatus for loading elongated members in an enclosure comprising a stand, an elongated carriage supported by said stand and adapted for longitudinal movement between a position wherein a longitudinal end portion of said carriage extends into an enclosure and a position wherein said end portion is withdrawn from said enclosure, means for conveying elongated members longitudinally on said carriage, a shock absorber mechanism engageable with the forward end of members being conveyed when said members reach a predetermined longitudinal position on said carriage and dump means for laterally unloading a member from said carriage when said member is stopped after being conveyed into the enclosure.

References Cited

UNITED STATES PATENTS

| 2,410,492 | 11/1946 | Garrow. |
| 2,649,978 | 8/1953 | Smith _____ 214—26 |
| 2,820,573 | 1/1958 | McConnell. |
| 2,921,699 | 1/1960 | Walters. |
| 3,169,642 | 2/1965 | Clark. |

ROBERT G. SHERIDAN, *Primary Examiner.*

U.S. Cl. X.R.

214—1